United States Patent [19]

Melchior

[11] Patent Number: 5,743,168
[45] Date of Patent: Apr. 28, 1998

[54] DEVICE FOR LUBRICATING AN ASSEMBLY BETWEEN TWO MECHANICAL COMPONENTS WHICH CAN MOVE WITH RESPECT TO EACH OTHER, ESPECIALLY A CONNECTING ROD/PISTON ARTICULATION

[76] Inventor: Jean Frédéric Melchior, 126 Boulevard du Montparnasse, 75014 Paris, France

[21] Appl. No.: 640,793

[22] PCT Filed: Oct. 4, 1995

[86] PCT No.: PCT/FR95/01289

§ 371 Date: Aug. 1, 1996

§ 102(e) Date: Aug. 1, 1996

[87] PCT Pub. No.: WO96/10706

PCT Pub. Date: Apr. 11, 1996

[30] Foreign Application Priority Data

Oct. 4, 1994 [FR] France ..................... 94 11842

[51] Int. Cl.⁶ ................................. F15B 21/04
[52] U.S. Cl. .................. 92/80; 92/82; 92/156; 92/157; 184/24
[58] Field of Search ............. 92/157, 156, 153, 92/80, 82; 184/24

[56] References Cited

U.S. PATENT DOCUMENTS

| | | | |
|---|---|---|---|
| 2,066,489 | 1/1937 | Shannon | 92/153 |
| 2,108,532 | 2/1938 | Frelin | 92/157 |
| 2,380,907 | 7/1945 | Hall | 92/157 |
| 3,380,556 | 4/1968 | Whitehead | 92/157 |
| 4,552,344 | 11/1985 | Johnson | 92/156 |

*Primary Examiner*—Thomas E. Denion
*Attorney, Agent, or Firm*—Larson & Taylor

[57] ABSTRACT

A device including a first moving part such as a piston (1) and a second moving part such as a connecting rod (2) with a coupling part (4) therebetween. A low-pressure compressible liquid lubricant feed system delivers a liquid into a chamber (10) with a variable volume between the second part and the coupling part, to form a pump supplying the joint interstice (16) to be lubricated, by a one-way connection (13, 15) and a resilient return member (11), wherein the interstice communicates with a cavity (17) with a fixed volume used as a liquid lubricant source. The volume, in relation to the pump displacement, enables a degree of deflection of the pump piston (3) while achieving a sufficiently high pressure and compensating for leakage.

16 Claims, 5 Drawing Sheets

DEVICE FOR LUBRICATING AN ASSEMBLY BETWEEN TWO MECHANICAL COMPONENTS WHICH CAN MOVE WITH RESPECT TO EACH OTHER, ESPECIALLY A CONNECTING ROD/PISTON ARTICULATION

SUMMARY OF THE INVENTION

The present invention relates to a device for the pressurized lubrication of an assembly between two mechanical components which can move with respect to each other, one of which is subjected to forces which are cyclically alternating in intensity but not in direction and of variable average intensity, these forces being transmitted to the other via a layer of oil filling an interstice having a defined area of action and located in the interface formed between the two mechanical components, which includes;

means for supplying compressible liquid lubricant at low pressure;

means for generating high pressure in the compressible liquid lubricant comprising a hydraulic pump which includes a piston capable of moving axially in a cylinder between two positions, so as to form a chamber of variable volume, the maximum variation of which is called the swept volume of the pump, the chamber of variable volume being connected, through one-way communication means, to the above-mentioned means for supplying liquid lubricant, and emerging through the one-way communication means into the above-mentioned interstice, and elastic return means acting on the above-mentioned pump piston so as to work against the action of the pressure of the pressurized liquid lubricant;

the above-mentioned means for generating high pressure in the compressible liquid lubricant being actuated directly by the above-mentioned cyclically alternating forces and by the return force of the above-mentioned elastic return means;

the above-mentioned elastic return means being designed to return the piston to its initial rest position when the intensity of the alternating cyclic forces approaches or is close to its minimum cyclic value, an articulation component being interposed between the two mechanical components which can move with respect to each other, the articulation component interacting with the first of the two mechanical components so as to form, between their interacting faces, the above-mentioned interface, and with the second mechanical component so as to form the above-mentioned hydraulic pump.

The invention relates especially to a lubricated device such as an assembly between a connecting rod and a piston, these being articulated to each other, of a fluid-compressing reciprocating machine, such as for example, a connecting rod/piston assembly of a two-stroke internal- or external-combustion reciprocating engine or a positive-displacement compressor. The invention relates especially to those of these assemblies in which the piston possesses, inside an externally cylindrical skirt, a bearing surface which may or may not be partially spherical and is intended to accommodate in an articulated manner the small end, which may or may not be partially spherical, of the connecting rod. Such devices are described in European Patent EP-A-0,280,622 and include:

a telescopic connecting rod, the small end of which has an extremity whose axis is parallel to the main axis of the connecting rod;

a piston sliding reciprocatingly in a cylinder interacting with a cylinder head so as to compress a fluid and having, in its lower part, a recess in which the small end of the connecting rod is housed;

an articulation component interposed between the connecting-rod small end and the piston, which has an external surface which interacts in its upper part, with a minimum functional clearance, with the internal surface of the above-mentioned recess made in the lower part of the piston;

one of the said connecting rod and said articulation component having an extremity made in the form of a cylindrical bush forming a piston and the other having a blind bore in which the above-mentioned extremity in the form of a cylindrical bush slides, with a minimum functional clearance, so as to delimit a first cavity or chamber of variable volume;

means for supplying pressurized liquid lubricant which make the above-mentioned first cavity of variable volume communicate, through a suction valve, with low-pressure supply means made in the connecting-rod shank and, through a delivery valve, with the above-mentioned interstice located in the interface between the internal surface of the above-mentioned recess made in the lower part of the piston and the upper external surface of the above-mentioned articulation component;

elastic return means interposed between the extremity in the form of a cylindrical bush and the upper surface of the blind bore in which this above-mentioned extremity slides;

the combination of the first cavity of variable volume, of the elastic return means and of the suction and delivery valves forming a high-pressure hydraulic pump actuated by the pressure of the compressed fluid which is exerted on the piston.

It is known that the lubrication of the connecting rod/piston articulation is critical in reciprocating engines, and especially engines operating on a two-stroke cycle. This is because, in the latter, the resultant of the forces is always directed in the same direction both at top dead center (TDC) and at bottom dead centre (BDC) so that it is very difficult to lubricate the connecting rod/piston articulation because of the exhaustion of the permanently compressed film of oil.

The above-mentioned European patent provides a solution to the problem, by producing in the device a high-pressure oil pump produced by the above-mentioned articulation component interposed between the connecting-rod small end and the piston, the bore of which forms a pump cylinder in which a pump piston, formed by the cylindrical-bush-shaped small end of the connecting rod, slides, it being possible for the elastic return means to be a spring preferably produced in the form of a metal bar installed in the shank of the connecting rod. This pump operates in delivery mode in the vicinity of TDC when the resultant of the downward forces compresses the spring, and in suction mode by relaxing the spring, the return force of which is greater than the resultant of the downward forces, at least in the vicinity of BDC.

However, this arrangement has several drawbacks. This is because the oil is introduced under pressure into the articulation when the engine piston is in the vicinity of TDC, that is to say, in general, when the forces being exerted on the articulation are a maximum, for example for a two-stroke reciprocating engine or a positive-displacement compressor. The pump must therefore deliver the lubricating oil under a very high pressure and within quite a narrow time window, in the vicinity of TDC. Producing such a device, implementing the sealing and controlling the deformations can therefore prove to be difficult, especially in machines in which high pressures are developed.

The present invention proposes to remedy these drawbacks and to provide a device for the lubrication of a connecting rod/piston articulation and, more generally by extension, of an assembly between two mechanical components which can move with respect to each other and are subjected to cyclically alternating forces, making it possible to ensure, in an efficient manner, lubrication of the interface between the above-mentioned components, by delivering the lubricating liquid at a pressure which is markedly lower than the extreme pressures likely to be reached in the interface, and this being so for a time making it possible to ensure complete supply of the interface, and even in the case of assemblies in which the resultant of the cyclic forces being exerted on the assembly is always oriented in the same direction and in the case where it may reach, cyclically, extremely high maximum values.

As a consequence, and in a general manner, the subject of the invention is an assembly as defined hereinabove and which is characterized in that:

the above-mentioned interstice communicates, preferably permanently, with a cavity of fixed volume forming a reserve of liquid lubricant;

the ratio between the volume of the cavity and the swept volume of the above-mentioned pump being sufficiently high so that, taking into account the compressibility of the compressible liquid lubricant, the above-mentioned pump piston can travel cyclically between its two positions, under only the action of the above-mentioned cyclically alternating forces and of the return force of the above-mentioned elastic return means, at least when the forces reach their maximum average intensity, that is to say the average intensity of the cyclically variable forces during running conditions under which the driving and/or resisting forces to which the components of the assembly are subjected are the highest anticipated for the assembly;

the area of action of the interstice being sufficiently high and the volume of the cavity, with respect to the swept volume of the pump, being sufficiently low so that the pressure generated in the interstice can reach the value enabling the first mechanical component to be moved away from the articulation component during that part of the cycle of variation in the cyclically alternating forces in which the intensity of these cyclic alternating forces is a minimum and at the end of a small number of cycles, preferably one cycle;

the swept volume of the pump being sufficiently high to be able to compensate cyclically for the quantity of liquid lubricant which can leak and escape from the above-mentioned interface via the functional clearances of the assembly, these clearances being sufficiently high to allow hydrodynamic lubrication of the assembly without direct contact between the constituent materials of the latter.

Although it is preferable for the above-mentioned cavity of fixed volume to communicate with the interface permanently, it is understood that it is sufficient for the communication to be established in the vicinity of Bottom Dead Center.

It is preferred that the cavity be filled in a single cycle so as to prevent intermittent lubrication, which is absent during the refilling period.

The assembly according to the invention may advantageously be an assembly articulated between a connecting rod and a piston of a fluid-compressing reciprocating machine as defined hereinabove.

In this embodiment, the volume of the cavity of fixed volume may advantageously be sufficiently high, with respect to the swept volume of the hydraulic pump, so that the pressure in the cavity remains less than the pressure of the said fluid multiplied by the ratio between the cross-section of the piston and the cross-section of the above-mentioned cylindrical bush forming, for example, the extremity of the connecting-rod small end.

The optimum volume of the cavity, taking into account the various dimensional and operational parameters of the assembly between the two components, may be determined, at least approximately, by a simple calculation, one example of which will be given hereinbelow.

In many cases, and especially in the case of devices for the lubrication of the piston/connecting rod articulation of reciprocating engines, especially engines operating on a two-stroke cycle, the volume of the said cavity may advantageously be between 30 and 100 times the swept volume of the pump, which swept volume may be determined in the usual manner knowing the dimensions of the interface, the pressures to which the two surfaces delimiting the interface are subjected and the leakage rate and therefore the desired flow rate of lubricant.

Preferably, the above-mentioned elastic return means are formed by a metal bar, or a bar made of any other suitable elastic material, for example a composite, housed axially in the above-mentioned second metal component and of a sufficiently small section to be completely compressed, so that the above-mentioned articulation component comes into direct contact with the said second metal component when the intensity of the above-mentioned cyclically alternating force is a maximum and directed from the first component to the second, and of a sufficiently large section to be completely relaxed, that is to say in such a way that the above-mentioned chamber of variable volume reaches its maximum value when the intensity of the above-mentioned cyclically alternating force is a minimum, the said bar being long enough so that, between the compressed position and the relaxed position, the material forming the said bar in no circumstance reaches its fatigue limit.

This bar may be produced as a single piece or may consist of two or more telescopic components arranged inside one another so as to obtain a large total longitudinal travel.

The fixed cavity according to the invention may be arranged in the articulation component or even in the above-mentioned first mechanical component, for example a piston, in which case the outlet for the liquid lubricant to the interstice is located in the communication between the delivery valve and the cavity. The cavity may also be made partially in the articulation component and the said first mechanical component.

The means which provide the unidirectionality of the lubricant flows may be conventional self-actuated seated valves, for example ball valves.

However, in an improvement of the invention which makes it possible to avoid the problems owing to inertia, to the low permeability and to the operating delay in this kind of valve, a suction valve may advantageously be used whose opening and closing are controlled directly by the movement of the hydraulic pump. For example, this suction valve of the hydraulic pump may be formed by a ring, preferably with no cut, housed in a circular groove made in the upper part and at the periphery of a cylindrical bush forming the upper extremity of the above-mentioned second mechanical component forming the piston of the pump and interacting with the above-mentioned articulation component by sliding axially in a blind cylindrical bore made in the articulation component, the external diameter of the ring, before mounting, being slightly greater than the internal diameter of the above-mentioned blind cylindrical bore so that this ring, when mounted, is lightly clamped in the bore, the internal diameter of this ring being substantially greater than the internal diameter of the groove and its height being substantially less than that of the groove so as to be able to move up and down in the groove, and the upper face of this ring being provided with radial passages enabling the compressible liquid lubricant to flow out from the above-mentioned chamber of variable volume to the above-mentioned means for supplying compressible liquid lubricant at low pressures when the ring is bearing on the upper face of the groove, the extra height of the circular groove with respect to the height of the ring being less than the compression stroke of the elastic return means.

When the above-mentioned first mechanical component forms the body of a cylindrical piston sliding in a cylinder of a fluid-compressing machine, the above-mentioned second mechanical component forms a connecting rod, the upper extremity of which may advantageously be cylindrical in order to interact with the above-mentioned articulation component which interacts with the above-mentioned first mechanical component in order to form the interface to be lubricated, sliding axially in a blind cylindrical bore made in the lower part of the articulation component, so as to form a pump chamber of variable volume.

In this case, the above-mentioned articulation component may be formed by a cylindrical gudgeon pin which is perpendicular to the main axis of the connecting rod and which interacts partially, with a minimum functional clearance, with a bore whose axis is perpendicular to the axis of the piston and which is of a diameter equal, to within the functional clearance, to that of the cylindrical gudgeon pin.

The above-mentioned articulation component may also be formed by a component whose upper external surface is partially spherical (by partially spherical is meant a surface allowing articulation of the ball-joint type) and whose axis lies on the axis of the connecting rod, and which includes, in its lower part, a blind cylindrical bore interacting with the above-mentioned cylindrical extremity of the connecting rod in order to form the above-mentioned chamber of variable volume. The above-mentioned first mechanical component, forming the piston body, includes a lower recess, the internal surface of which is also partially spherical and the center of which lies on the main axis of the connecting rod, so as to interact partially, with a minimum functional clearance, with the external surface of the above-mentioned articulation component.

BRIEF DESCRIPTION OF THE DRAWINGS

Other advantages and characteristics of the invention will appear on reading the following description, given by way of non-limiting example, and with reference to the appended drawing in which.

DESCRIPTION OF THE PREFERRED EMBODIMENTS

Figure 1:
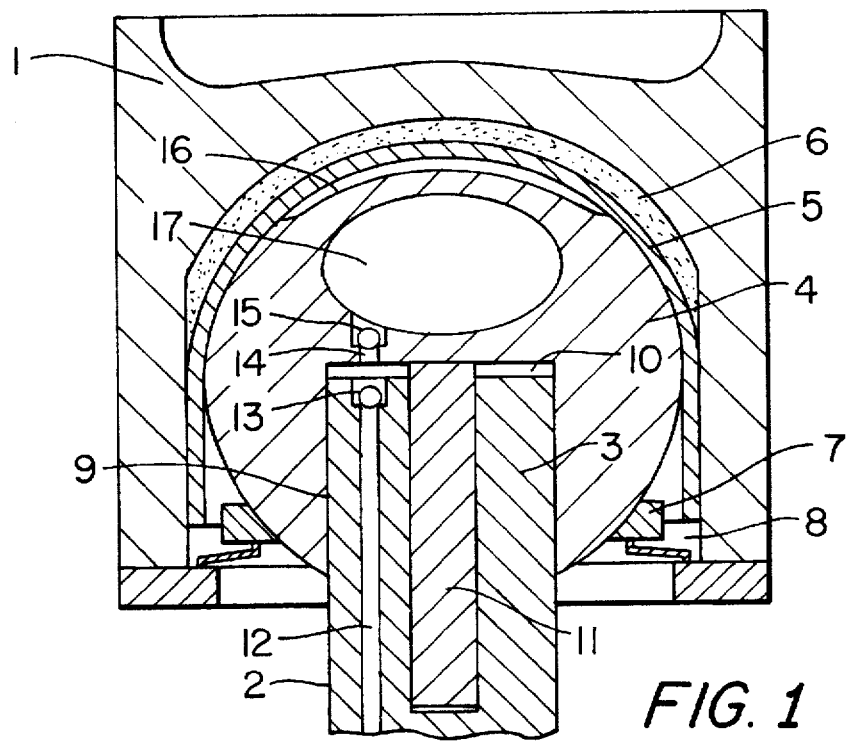
FIG. 1 represents a diagrammatic sectional view of a device according to the invention with an articulation of the ball-joint type.

Reference is first of all made to FIG. 1

Shown in this figure is an assembly in accordance with the invention, comprising a first movable mechanical component (1), namely a two-stroke diesel engine piston, which moves in a cylinder (not shown) of the engine under the effect of the engine gases, and a second movable mechanical component, namely a connecting rod (2), the big end of which is mounted on an engine crank (not shown) and the small end (3) of which is articulated under the piston (1).

The articulation is effected by means of an articulation component (4) of generally spherical shape, the upper spherical surface of which bears against a thin shell (5), also of partially spherical shape, accommodated in the bottom of a cylindrical internal recess having a spherical upper end face made in the piston (1).

Housed between the shell (5) and the bottom of this recess is a material (6) which is capable of creeping and plays an adaptation role, for example described in Patent EP-A-0, 280,622, it being impossible for this material to pass out of the volume thus created between the piston and the shell (5) because of the sealing produced between the shell and the piston in the cylindrical region of the recess and in the corresponding cylindrical region of the shell.

The lower face of the shell (5) forms one of the faces of the interface to be lubricated while the polar part of the upper surface of the articulation component (4) forms the other face of the interface.

As a consequence, the two faces delimit an interstice capable of being filled with lubricating oil and bordered, at its periphery, by a substantially annular region in which the surfaces of the component (4) and of the shell (5) may come into contact in the absence of oil.

The articulation component or ball (4) is kept in place inside the cavity in the piston (1) by virtue of a retaining ring (7) pushed up in the direction of the upper part of the piston by an elastic element (8) and it is therefore understood that a certain axial travel is possible between the component (4) and the shell (5) of the piston along the vertical axis of revolution of the piston.

As already described in European Patent EP-A-0,280,622, the articulation component (4) has, on the lower side, a blind bore (9) centered on the longitudinal axis of the piston and forming a pump chamber.

The upper extremity of the small end (3) of the connecting rod (2) can slide in this bore (9), said upper extremity being machined so as to have a cylindrical shape in order to form a pump piston capable of sliding in the bore (9) in order to determine with it the chamber (10), of variable volume, of the pump.

Arranged in the shank of the small end (3) is an elastic return means produced in the form of a metal bar (11) which is housed with a functional clearance in an axial hole in the connecting rod and the length of which, in the free state, is greater than the depth of the hole so as to extend into the chamber (10) and come into contact with the bottom of the bore (9) made in the ball (4).

This bar thus forms an elastic element capable of being compressed when the downward-oriented resultant of the forces, which is applied by the piston on the articulation component (4), is high, especially in the vicinity of TDC, and of being uncompressed when this force resultant becomes low, especially in the vicinity of BDC.

The pump thus produced is supplied with liquid lubricant by means of a channel which is made longitudinally in the connecting rod (2) and the lower extremity (not shown) of which receives the influx of low-pressure oil or lubricant, as is well known.

The duct (12) emerges in the chamber (10) via a suction check valve (13) which allows low-pressure oil to pass upwards only when the pressure in the chamber (10) becomes less than the low pressure of the supply.

Delivery by the pump is provided by a duct (14) emerging into the chamber (10), provided with a delivery check valve (15), and emerging into the interstice (16) between the ball (4) and the shell (5).

In accordance with the invention, a cavity (17) of fixed volume is provided in the delivery passage and, in this case, this cavity (17) is made in the ball (4) itself, the ball possibly consisting, for example, of two parts joined together in order to produce the cavity.

Figure 2:
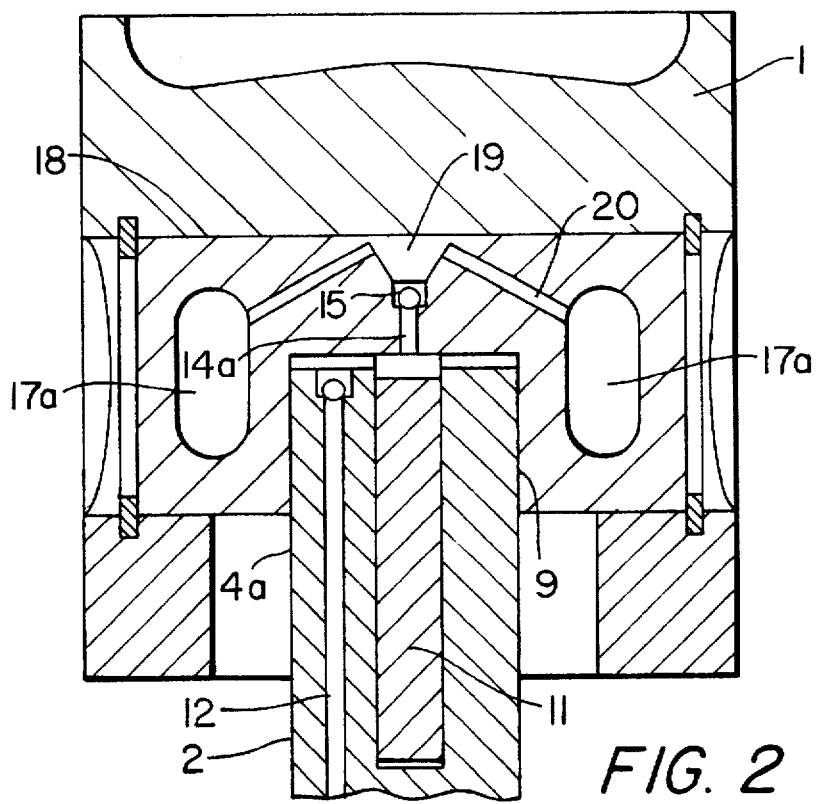
FIG. 2 represents a diagrammatic sectional view of a device according to the invention with an articulation of the pivot-pin type.

Reference is now made to FIG. 2 which is distinguished from FIG. 1 essentially by the fact that the articulation component (4a) consists of a cylindrical gudgeon pin pivoting in a corresponding transverse cylindrical bearing surface of the piston (1), being held in place therein by axially retaining circlips so that the interface between the first and second movable mechanical components, that is to say the piston (1) and the connecting rod (2), is formed by the internal surface of the transverse bearing surface (18) of the piston and the external surface of the gudgeon pin or pivot (4a).

A blind bore (9) is made, as previously, in the articulation component (4a) in order to accommodate the connecting-rod small end with its bar and its suction inlet provided with the one-way suction valve.

The delivery duct (14a) provided with its one-way delivery valve (15) emerges into the interface via a widening region (19) which is constantly in communication via ducts (20) with two constant-volume cavities (17a).

It is understood that, in this embodiment, the cavities (17a) are not directly located in the delivery duct but that they simply communicate directly with the duct, downstream of the valve (15), at the interface.

In accordance with the invention, the constant-volume cavity (17 or 17a), arranged between the delivery valve (15) of the pump and the oil outlet into the interface of the articulation, forms an oil accumulator or reservoir, the volume of which is sufficiently greater than the working swept volume of the pump in order to limit the pressure increase, but sufficiently low to increase the pressure sufficiently to allow the accumulated oil to flow out into the articulation when the force being exerted on the piston (1) drops down again, and especially, for example, when the piston comes back down to BDC, by more than the half-stroke, this being so in a limited number of cycles, preferably in a single cycle.

Figure 7:
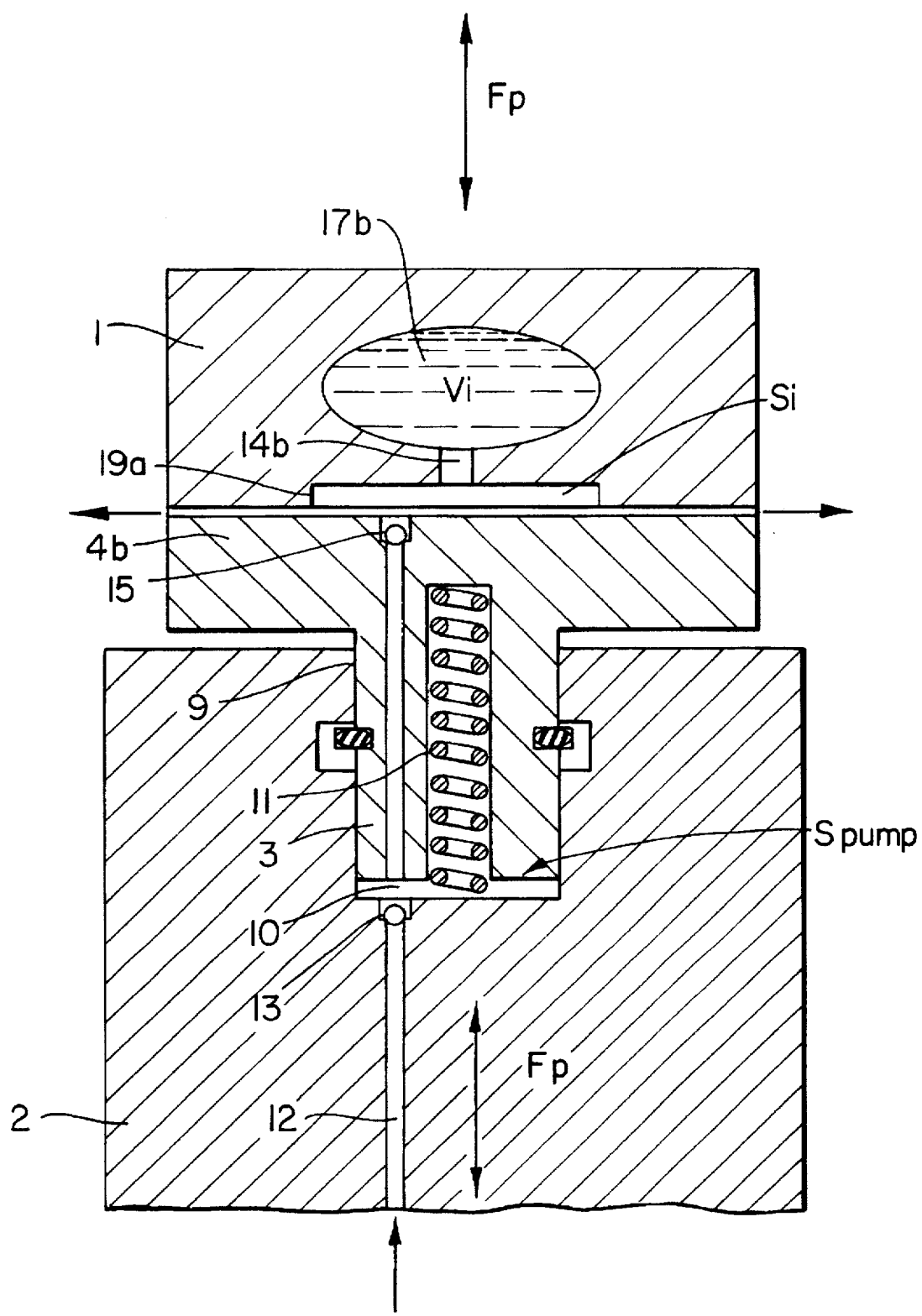
FIG. 7 represents a diagrammatic view on a larger scale, intended to explain the operating principle of the invention.
Figure 8:
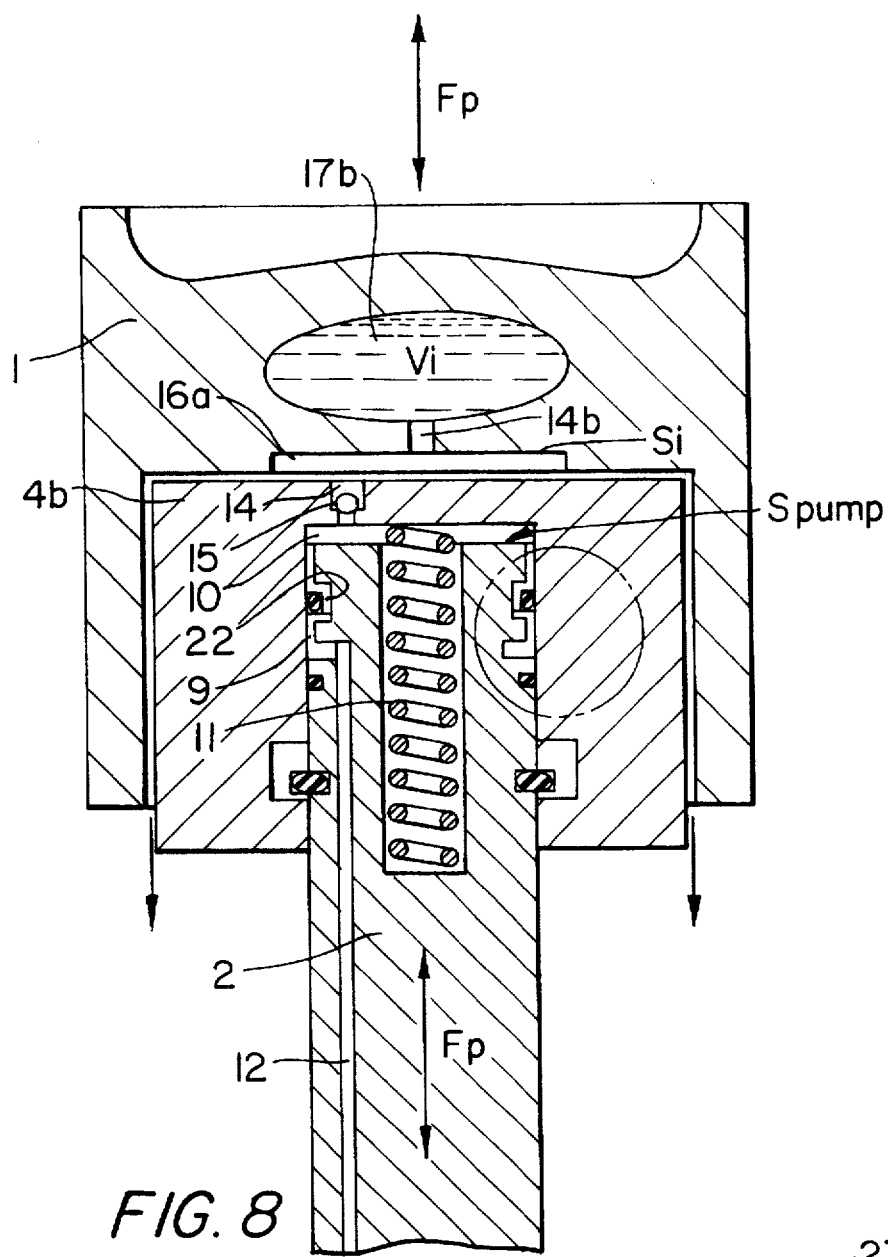
FIG. 8 represents a view similar to FIG. 7, with an improved inlet-valve system.

Referring to FIGS. 7 and 8, it may be seen that the above-mentioned cavity, referenced (17b), of fixed volume Vi, may be made in the above-mentioned first mechanical component (1), for example a piston of a two- or four-stroke engine, this cavity communicating directly with the volume of the interstice (16a, 19a) via a duct (14b) in communication with the delivery duct (14) made in the articulation component (4b).

It may further be seen in FIG. 7 that the pump piston may be formed by a cylindrical-bush-shaped extremity of the articulation component, the blind bore then being made in the extremity of the second movable component, for example a connecting rod.

The operation is as follows:

Under steady running conditions, a film of oil is present between the two surfaces of the interface, that is to say between the shell (5) and the component (4).

At TDC, the resultant of the forces transmitted downwards by the piston to the connecting rod by means of the interface and of the movable component (4) is a maximum and the lubrication of the interface takes place by exhaustion of the film of oil.

In this position, the bar (11) is completely compressed and the chamber (10) at its minimum volume.

As the piston/connecting rod assembly descends, the force transmitted downwards progressively decreases and, for example, a little after the half-stroke of the piston, it becomes sufficiently low to allow the bar (11) to start to relax and, consequently, to allow the chamber (10) to increase in volume.

A decrease in pressure in the chamber (10) then allows the suction valve (13) to open and oil to flow in via the low-pressure duct (12) towards the chamber, it thus being possible for this influx of oil into the chamber to be spread over a significant portion of the machine's cycle on either side of BDC.

When the piston comes back up after having reached BDC, the resultant of the forces, which is owing to the compression of the fluid in the chamber of the engine cylinder, increases until the bar starts to be compressed, so that the suction valve (13) is applied against its seat and so that the pressure of the oil in the chamber (10) increases, causing the delivery valve (15) to open and causing the oil to pass into the accumulator-forming cavity (17) when the pressure in the chamber (10) increases sufficiently to exceed the pressure in the cavity (17), the leakage rate of the oil out of the cavity (17) becoming progressively smaller, because of the increase in the pressure on the film of oil in the interstice owing to the increase in the force applied by the piston downwards on the articulation component (4) and because of the progressive exhaustion of the oil.

Moreover, when during the descent of the piston the force transmitted via the piston to the ball (4) becomes sufficiently low, the pressure of the oil compressed in the cavity (17) exerted on the two faces of the interstice is sufficiently high to increase the separation between the components (1) and (4), allowing a quantity of oil to leave the cavity (17), to rejoin the interstice between the ball (4) and the shell (5), and to spread out from this interstice in order to renew the film of oil in the clearance between the two movable components.

In this case, the magnitude of the effective section of the interstice, of the volume of the cavity with respect to the swept volume of the pump, enabling the pressure in the chamber (10) to be controlled, and of the swept volume of the pump actuated cyclically in order to renew at each cycle the film of oil between the two components (1) and (4) with a sufficient flow rate and therefore a thickness of oil enabling this film to be never totally exhausted during the rest of the cycle, is clearly known.

It is clear that the volume of the cavity (17) and the swept volume of the pump may be adjusted so that this outflow of oil occurs during a major period of the cycle on either side of BDC.

It is clear that, under steady running conditions, the average delivery rate of the pump is equal to the flow rate of the flow of oil through the functional clearance.

This flow rate increases directly in proportion to the clearance so that natural adjustment of the clearance occurs.

The delivery rate of the pump (and therefore its swept volume) will therefore have to be chosen so as to be sufficient for the articulation to remain under conditions of hydrodynamic lubrication, without direct contact between the surfaces of the interface.

At start-up, the oil pressure in the accumulator (17) is zero. This pressure will increase as soon as the pump is able to send its quantity of oil to the accumulator (17).

It is desirable for this pressure to increase sufficiently quickly so that a quantity of oil can escape, close to BDC, in order to penetrate into the interstice of the interface of the articulation and to ensure lubrication.

As the example described hereinbelow shows, this condition may be reached in a very small number of cycles, preferably in just one.

Example: MT 135 engine of 135 mm bore

For this example, reference may also be made to FIG. 7.

Cross-section of the piston: 143 cm$^2$

Total mass of the piston (piston body and the articulation): 10 kg

Mass of the piston proper (without its articulation): 7 kg

Maximum combustion pressure: 300 bar

Minimum pressure in the cylinder at BDC: 18 bar

Speed of rotation: 1800 rpm

Stroke: 170 mm

Length of the connecting rod: 284 mm

Upward acceleration at TDC: 400 g at 1800 rpm

Downward acceleration at BDC: −216 g at 1800 rpm

Downward force at TDC: 300×143−400×10=38.9 ton, i.e. 381,220 N.

Downward force at BDC: 18×143+216×10=4.7 ton, i.e. 46,060 N.

Preload of the metal bar: 10 ton, i.e. 98,000 N.

Stiffness of the metal bar: Kb=10 ton/mm, i.e. 98,000 N.

Working swept volume of the pump: 400 mm$^3$ per cycle

Cross-section of the pump piston: Sp=8 cm$^2$

Working stroke of the pump: 0.50 mm

Effective section of the interface of the articulation: 10 cm$^2$

Fixed volume of the oil cavity: 12 cm$^3$ [i.e. 30 times the swept volume of the pump].

Coefficient of compressibility of the oil Kh=15,000 bar

Operation of the Articulation

When the piston of the engine approaches its Top Dead Center (TDC), the downwardly directed forces clearly dominate and as a result completely compress the metal bar until it comes against its stop:

Forces owing to the action of the gases:
300 × 143/1000 = 42.90 ton,
i.e. 420,420 N Inert forces:

-continued
400 × 10/1000 = −4.00 ton,
i.e. 39,200 N.

Forces owing to the compression of the bar:
10 + 0.5 × 10 = −15.00 ton,
i.e. 147,000 N.

Forces owing to the oil pressure:
500 × 8/1000 = −4.00 ton,
i.e. 390,200 N.

Resultant of forces (downwards):
19.90 ton, i.e. 195,020 N.

At each stroke of the pump, the pressure rise in the reservoir will in fact, to a first approximation, be:

$P=15,000\times(V/V)=15,000\times400/12,000=500$bar.

The complete swept volume of the pump will therefore be stored in the oil cavity at a pressure of at least 500 bar (assuming that the pressure is zero in the reservoir at the start of the compression cycle).

This pressure exerted on the effective section (10 cm$^2$) of the interstice will exert an upward force of 500×10/1000=5 ton, i.e. 49,000 N., which will tend to move the piston body away from the articulation component, but this force is counteracted by the downward force, applied on the piston body, which is (143×300−7×400)/1000=40.1 ton, i.e. 392, 980 N.

On the other hand, when the piston of the engine approaches Bottom Dead Center (BDC), the upward forces clearly dominate:

Forces owing to the action of the gases:
18 × 143/1000 = 2.57 ton,
i.e. 25,186 N.

Inertial forces:
216 × 10/1000 = 2.16 ton,
i.e. 21,168 N.

Forces owing to the compression of the bar:
10 + 0.5 × 10 = −15.00 ton,
i.e. 147,000 N.

Resultant of forces (upwards):
−10.27 ton, i.e. 100,646 N.

This means that towards mid-stroke of the piston downwards, the metal bar will become uncompressed and that the pump will fill up again with one swept volume via the clearance of the delivery and suction valves.

Moreover, the pressure existing in the interstice (500 bar) will exert an upwardly directed force of 5 ton, i.e. 49,000 N, on the effective section of the interstice (10 cm$^2$) while the forces exerted downwards on the piston body are now only:

Forces owing to the action of the gases:
18 × 143/1000 = 2.57 ton,
i.e. 25,186 N.

Inertial forces on the piston body:
216 × 7/1000 = 1.15 ton,
i.e. 14,798 N.

Resultant of forces on the piston body:
4.08 ton, i.e. 39,984 N.

The clearance between the two components will therefore open and discharge the oil reservoir, lubricating the articulation as the oil passes.

It may be understood that if the volume of the cavity (17) is much smaller, for example comparable to the swept volume of the pump, a very high pressure will be obtained in the interface in the vicinity of TDC whereas the hydraulic pump will only operate at a low delivery rate.

In contrast, if the volume of the reservoir is too high, the pressure in the cavity of fixed volume will be insufficient and a large number of cycles of the engine piston will be necessary in order to pressurize the volume, with the risk of operating without lubrication during this filling time, this situation occurring in a periodic manner.

In contrast, by virtue of the invention, by a judicious choice, on the one hand, of the swept volume of the pump and, on the other hand, of the fixed volume of the cavity, the person skilled in the art may determine the dimensions for the assembly so as to make the oil penetrate into the interface at a relatively moderate high pressure, for example less, by more than half, than the pressure which would have to be developed if the pump were to deliver directly into the interface without a cavity, and for a sufficiently long period of time to ensure that the oil flows out correctly into the interface.

Figure 3:
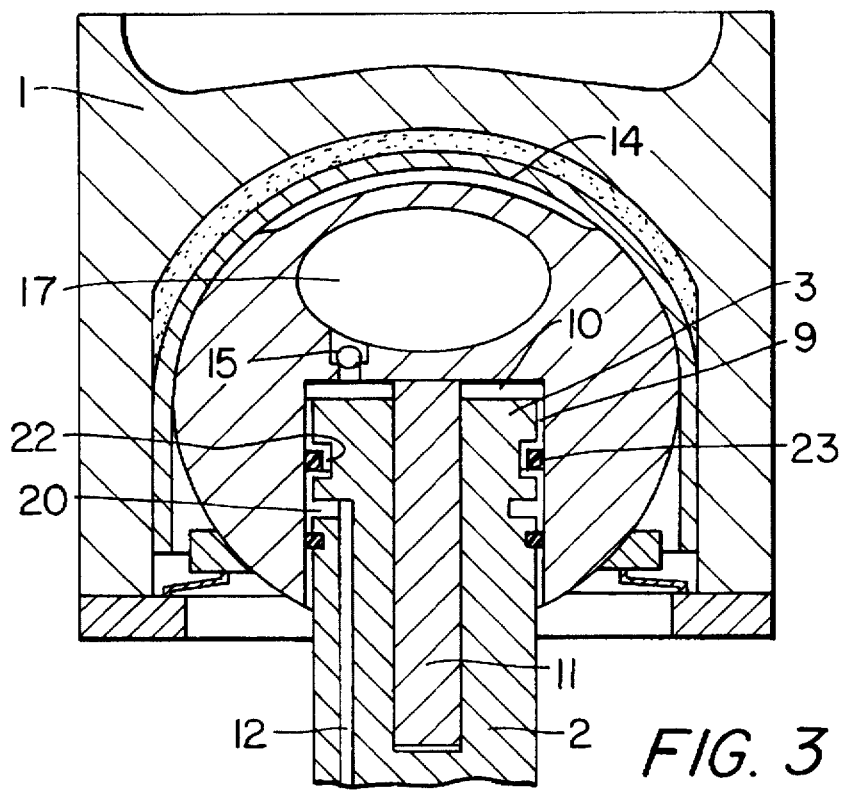
FIG. 3 represents a view of a device according to FIG. 1 with an improved inlet-valve means.
Figure 8A:
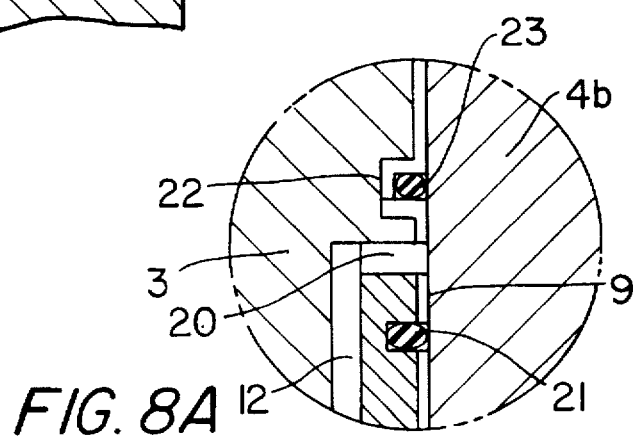
FIG. 8A represents an enlarged view of the circled portion of FIG. 8.

Reference will now be made to FIGS. 3, 8 and 8A.

On account of the fact that a single suction valve, such as (13), has problems associated, for example, with its inertia, it may be advantageous, instead, to use a suction valve means whose opening and closing are controlled directly by the movement of the hydraulic pump.

As may be seen in FIGS. 3 and 8, the suction duct (12) of the connecting rod emerges directly into a peripheral groove (20) in communication with the small clearance between the cylindrical wall of the piston formed by the connecting-rod small end (3) and the concentric cylindrical wall of the bore (9).

A usual sealing ring (21) is provided under the groove (20).

In contrast, above the groove (20), a circular groove (22) is made in which a ring (23) may travel longitudinally and radially, the initial diameter of this ring (23) being slightly greater than the diameter of the bore (9) so that, when fitted, this ring is lightly clamped against the cylindrical surface of the bore.

As may be seen in the figure, the internal diameter of this ring is substantially greater than the internal diameter of the groove (22) and its height is substantially less than that of the groove, the difference between the height of the groove and the height of the ring being less than the compression stroke of the elastic return means formed by the bar (11).

Furthermore, the upper surface, that is to say the surface facing the chamber (10), of the ring (23) is provided with a plurality of small radial grooves enabling the oil to flow out.

In suction mode, that is to say when the volume of the chamber (10) is increasing, the relaxation of the bar pushes the articulation component (4) back, which drives the ring upwards because of its clamping, but the oil can pass radially through the upper face of the ring and penetrate into the chamber (10), lubricating, as it passes, the interstice between the small end (3) and the bore (9).

In delivery mode, the ring (23) is pushed back downwards and its lower face, bearing on the lower face of the groove, prevents the oil from returning.

Figure 4:
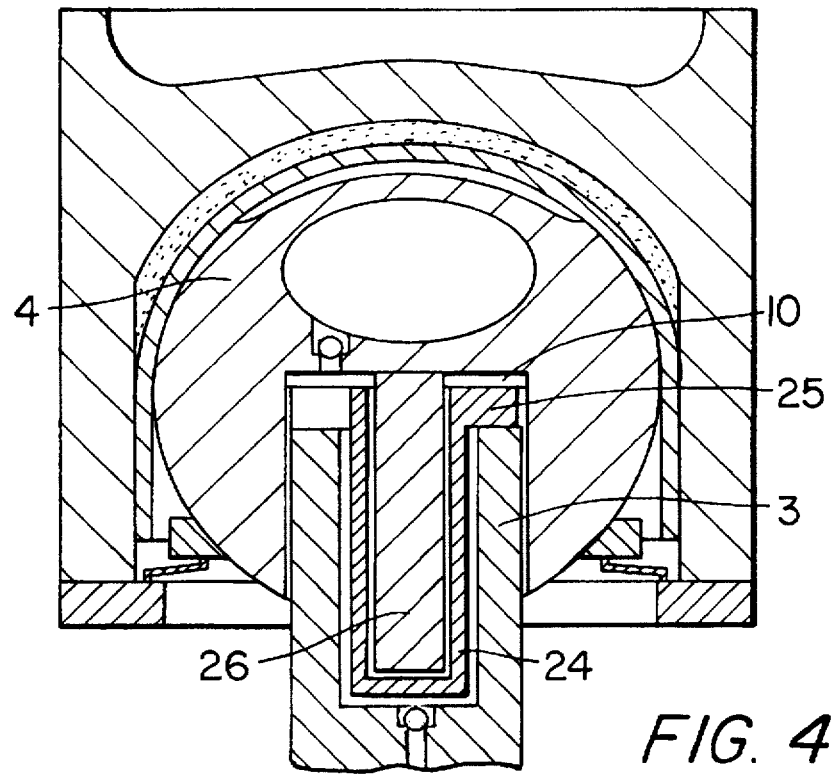
FIG. 4 represents a view of a device similar to FIG. 1 with a telescopic metal bar acting as an elastic return means.

Reference is now made to FIG. 4.

When it is desired to develop a large swept volume of the pump for liquid lubricant, while still using a metal bar for the elastic return, the problem arises of the elastic resistance of the material of which the bar is composed.

The elastic compressibility stroke of the bar may be substantially increased, without increasing its longitudinal extent, by producing a telescopic bar consisting of a first bar part (24) capable of travelling longitudinally in a cylindrical recess internal to the connecting-rod small end (3), having a peripheral shoulder (25) resting on the upper extremity of the connecting rod, while the bottom (26) is some distance from the bottom of the cylindrical recess in the connecting rod, this first bar part (24) accommodating, with a functional clearance, a second cylindrical bar part (26) which, at rest, and when it is applied against the bottom of the first bar part (24), extends beyond the shoulder (25) in order to come into contact with the articulation component (4) and thus determine the position of larger volume of the chamber (10).

Figure 5:
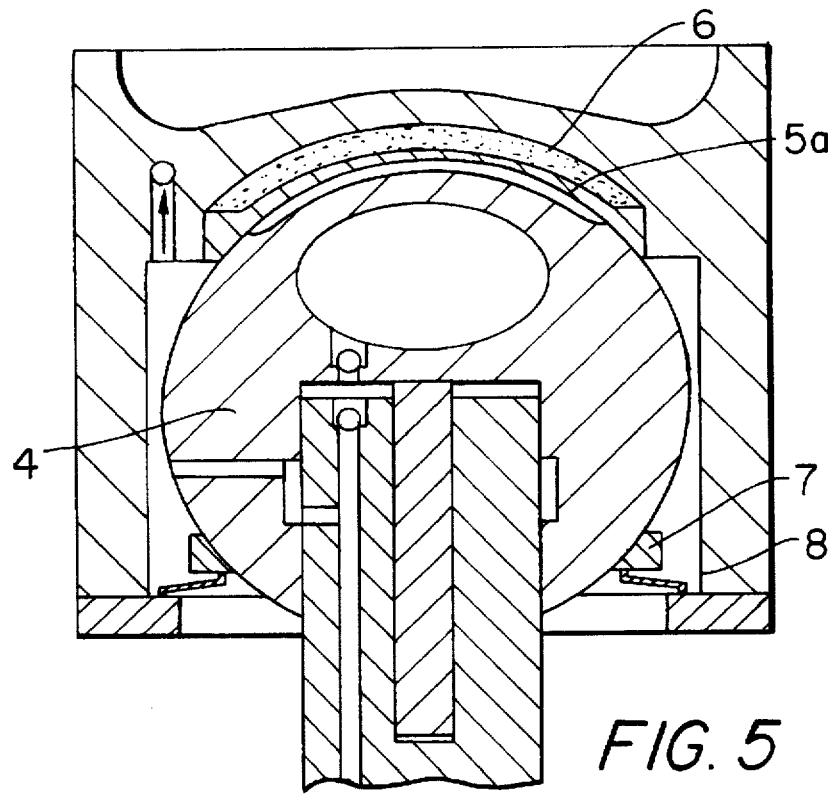
FIG. 5 represents a variant of this device in the case of a ball having a small bearing surface.

Referring to FIG. 5, an arrangement of the articulation according to the invention may be seen in which the rubbing surface of the spherical articulation component (4) and of the shell (5a) is small so as to avoid mechanical losses and a pinching effect of the equatorial part of the ball by the cylindrical bearing surface of the shell.

This is effected by the use of a shell (5a) of diameter less than the diameter of the sphere and housed in a cylindrical extension of low height and having a spherical bottom made in the piston (1).

Figure 6:
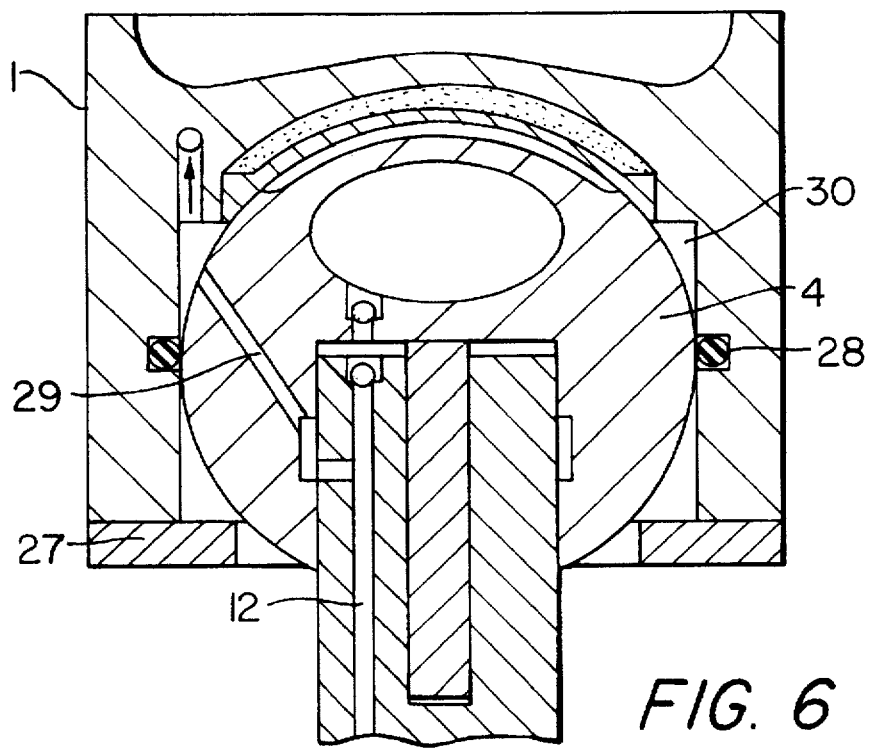
FIG. 6 represents such a device for a two-stroke engine with sealing means between the first component and the articulation component.

Reference is now made to FIG. 6.

In order to establish circulation of lubricating oil in the piston using the low-pressure oil inlet (12) in the connecting rod, it is possible to produce an oil branch-off, as shown in FIG. 5.

However, it is necessary to prevent the oil from immediately dropping back downwards and, for this purpose, it is necessary to provide sealing at the ring (7) and the elastic means (8), as shown in FIG. 5.

In order to eliminate the rubbing forces which result therefrom, it is possible to omit the ring (7) and the elastic element (8) because, at least in a two-stroke diesel-type engine, the resultant of the forces exerted by the piston (1) is always directed downwards, that is to say towards the connecting-rod small end.

In this case, it is enough to arrange, at the lower extremity of the skirt of the piston, a retaining means (27) which, normally, is not in contact with the articulation component (4), and to provide, in the equatorial plane of the ball (4), a single seal (28) housed, for example, in a groove in the internal surface of the skirt of the piston (1).

The branch-off (29) of the conduit (12) thus terminates in a volume (20) internal to the piston sealed at its lower part, from which volume it is possible to establish the circulation of oil in the piston.

I claim:

1. Device for a pressurized lubrication of an assembly between first and second mechanical components which move with respect to each other, said first component being subjected to forces which are cyclically alternating in intensity but not in direction and of variable average intensity, these forces being transmitted to said second component via a layer of a compressible liquid lubricant filling an interstice having a defined area of action and located in an interface formed between said first and second mechanical components, where a quantity of said lubricant leaks and escapes from said interface via functional clearances in said assembly, which said assembly includes:

means for supplying the compressible liquid lubricant at low pressure;

means for generating high pressure in the compressible liquid lubricant comprising a hydraulic pump which includes a pump piston axially moveable in a cylinder between two extreme positions, so as to form a chamber having a variable volume which is variable between a minimal volume and a maximal volume, which variation is called a swept volume of the pump, said chamber of variable volume being connected, through a first one-way communication means, to said means for supplying liquid lubricant, and emerging through a second one-way communication means into said interstice, and elastic return means exerting a return force on said pump piston so as to increase said variable volume of said pump;

said means for generating high pressure in said compressible liquid lubricant being actuated by said cyclically alternating forces and by the return force of said elastic return means;

said elastic return means returning said pump piston to an initial rest position when the intensity of said cyclically alternating forces approaches or is close to a minimum cyclic value, an articulation component being interposed between said first and second mechanical components which move with respect to each other, said articulation component interacting with the first mechanical component so as to form said interface, and with said second mechanical component so as to form said hydraulic pump;

said device being characterized in that:

said interstice communicates with a cavity of fixed volume forming a reserve of the liquid lubricant;

a ratio between the fixed volume of said cavity and said swept volume of said pump being sufficiently high so that said pump piston travels cyclically between two positions, under only the action of said cyclically alternating forces and of said return force of the elastic return means, at least when said forces reach a maximum average intensity;

said defined area of action of the interstice being sufficiently high and the fixed volume of said cavity, with respect to said swept volume of the pump, being sufficiently low so that a pressure generated in said interstice reaches a value enabling said first mechanical component to be moved away from said articulation component during that part of a cycle of variation in said cyclically alternating forces in which the intensity of said cyclically alternating forces is a minimum and at an end of a small number of cycles;

said swept volume of said pump being sufficiently high to compensate cyclically for said quantity of liquid lubricant which leaks and escapes from the said interface via said functional clearances of the assembly, said functional clearances being sufficiently high to allow hydrodynamic lubrication of said assembly without direct contact between said components of said assembly.

2. Device according to claim 1, for the lubrication of said assembly where said second and first mechanical components respectively comprise a connecting rod and a machine piston, which are articulated to each other, and which form parts of a fluid-compressing reciprocating machine.

3. Device according to claim 2, which includes:

a telescopic said connecting rod forming said second mechanical component, a small end of which has an extremity whose axis is parallel to a main axis of the connecting rod;

said piston forming said first mechanical component and sliding reciprocatingly in a cylinder interacting with a cylinder head so as to compress a fluid and having, in a lower part thereof, a recess in which the small end of the connecting rod is housed;

said articulation component interposed between said connecting-rod small end and said piston, which said articulation component has an external surface which interacts in an upper part thereof, with a minimum functional clearance, with an internal surface of said recess;

one of said connecting rod and said articulation component having an extremity in the form of a cylindrical bush forming a bush piston and the other having a blind bore in which said extremity in the form of a cylindrical bush slides, with a minimum functional clearance, so as to delimit a first cavity of variable volume;

means for supplying pressurized liquid lubricant which make said first cavity of variable volume communicate, through a suction valve, with said low-pressure supply means made in a shank of the connecting-rod and, through a delivery valve, with the interstice located between the internal surface of the said recess made in the lower part of said piston and the upper external surface of said articulating component;

said elastic return means being interposed between the extremity of said connecting rod small end in the form of a cylindrical bush and an upper surface of said blind bore in which this said connecting-rod extremity slides;

the combination of said first cavity of variable volume, of said elastic return means and of said suction and delivery valves forming a high-pressure hydraulic pump actuated by the pressure of the compressed fluid which is exerted on said piston, characterized in that the volume of said cavity of fixed volume is sufficiently high, with respect to said swept volume of said hydraulic pump, so that the pressure in said cavity remains less than the pressure of said compressed fluid multiplied by the ratio between the cross-section of said piston and the cross-section of the said cylindrical bush forming the extremity of said connecting rod small end.

4. Device according to claim 1, characterized in that the volume of said cavity is between 30 and 100 times the swept volume of the pump.

5. Device according to claim 1, characterized in that said elastic return means are formed by a metal bar made of a first metal housed axially in said second component which is made of a second metal and said metal bar being of a sufficiently small section to be completely compressed, so that the said articulation component comes into direct contact with said second metal component when the intensity of the cyclically alternating force is a maximum and directed from the first component to the second component, and of a sufficiently large section to be completely relaxed in such a way that said chamber of variable volume reaches the maximum value when the intensity of the cyclically alternating force is a minimum, said metal bar being long enough so that, between a compressed position and a relaxed position, the first metal forming said metal bar in no circumstance reaches a fatigue limit thereof.

6. Device according to claim 5, characterized in that said metal bar consists of two or more telescopic components arranged in one another so as to obtain a large total longitudinal travel.

7. Device according to claim 1, characterized in that said cavity of fixed volume is arranged in said articulation component and an outlet for the liquid lubricant to said interstice is located in a communication between a delivery valve and said cavity.

8. Device according to claim 1, characterized in that said first and second one way communication means are self-actuated valves.

9. Device according to claim 1, characterized by a suction valve whose opening and closing are controlled directly by a movement of the hydraulic pump.

10. Device according to claim 9, characterized in that said suction valve of the hydraulic pump is formed by a ring housed in a circular groove made in an upper part and at a periphery of a cylindrical bush forming an upper extremity of the said second mechanical component forming the piston of the pump and interacting with said articulation component by sliding axially in a blind cylindrical bore made in said articulation component, an external diameter of said ring, before mounting, being slightly greater than an internal diameter of the said blind cylindrical bore so that said ring, when mounted, is lightly clamped in said bore, an internal diameter of said ring being substantially greater than an internal diameter of the said groove and a height of said ring being substantially less than that of said groove so as to move up and down in said groove, and an upper face of said ring being provided with radial passages enabling the compressible liquid lubricant to flow out from the said chamber of variable volume to the said means for supplying compressible liquid lubricant at low pressures when the ring is bearing on the upper face of the groove, an extra height of the circular groove with respect to the height of the ring being less than a compression stroke of the said elastic return means.

11. Device according to claim 2, characterized in that the said articulation component is formed by a cylindrical gudgeon pin which is perpendicular to a main axis of said connecting rod and which interacts partially, with a minimum functional clearance, with a bore whose axis is perpendicular to an axis of said piston and which is of a diameter equal, to within the functional clearance, to that of said cylindrical gudgeon pin.

12. Device according to claim 2, characterized in that said articulation component forms a component of which an upper external surface is partially spherical and which includes, in a lower part thereof, a blind cylindrical bore interacting with said cylindrical extremity of the connecting rod in order to form said chamber of variable volume, said first mechanical component, forming the piston, including a lower recess, an external surface which is also partially spherical having a center which lies on a main axis of said connecting rod, and which interacts partially, with a minimum functional clearance, with an external surface of said articulation component, a partially spherical upper external surface whose center lies on an axis of the piston and whose diameter is substantially equal to that of the partially spherical external surface of the first mechanical component forming the piston.

13. Device according to claim 12, characterized in that said external surface of said lower recess in the piston is provided by a partially spherical shell delimiting, between said shell and said piston, a space in which a material capable of creep is trapped, said material capable of creep filling said space entirely.

14. Device according to claim 12, characterized in that, in order to form said interface, said spherical articulation component interacts with an external piston recess surface of smaller diameter compared to a diameter of said articulation component and in that a seal (28) with respect to the lubricant is interposed between said piston and said component substantially in an equatorial plane of said component in order to delimit a volume of lubricant capable of supplying a piston lubrication system.

15. Device according to claim 1, characterized in that said small number of cycles is one.

16. Device according to claim 1, characterized in that said fixed cavity is arranged in said first mechanical component and the outlet for the liquid lubricant to said interstice is located partially in the said articulation component and the said first mechanical component.

\* \* \* \* \*